(12) United States Patent
Comacchio et al.

(10) Patent No.: US 12,709,340 B2
(45) Date of Patent: Aug. 18, 2026

(54) TRACKED UNDERCARRIAGE FOR OPERATING MACHINES

(71) Applicant: Comacchio SpA, Riese Pio X (TV) (IT)

(72) Inventors: Renzo Comacchio, Riese Pio X (TV) (IT); Pasqualino Comacchio, Riese Pio X (TV) (IT); Patrizio Comacchio, Riese Pio X (TV) (IT)

(*) Notice: Subject to any disclaimer, the term of this patent is extended or adjusted under 35 U.S.C. 154(b) by 334 days.

(21) Appl. No.: 18/290,624

(22) PCT Filed: Jul. 26, 2021

(86) PCT No.: PCT/IB2021/056751

§ 371 (c)(1),
(2) Date: Jan. 19, 2024

(87) PCT Pub. No.: WO2023/002241

PCT Pub. Date: Jan. 26, 2023

(65) Prior Publication Data

US 2024/0227957 A1 Jul. 11, 2024

(30) Foreign Application Priority Data

Jul. 21, 2021 (IT) ........................ 102021000019409

(51) Int. Cl.
*B62D 55/084* (2006.01)
*B62D 55/06* (2006.01)

(52) U.S. Cl.
CPC ........... *B62D 55/084* (2013.01); *B62D 55/06* (2013.01)

(58) Field of Classification Search
CPC ... B62D 55/084; B62D 55/06; B62D 49/0678
See application file for complete search history.

(56) References Cited

U.S. PATENT DOCUMENTS 3,749,193 A * 7/1973 Blase .................. B60B 35/1054 180/9.48
5,505,274 A * 4/1996 Satzler ............... B62D 55/0842 180/9.5
5,638,908 A * 6/1997 Masumoto .............. E02F 9/024 280/638
5,901,800 A * 5/1999 Wilson ................. B62D 55/084 180/327
6,145,610 A * 11/2000 Gallignani ........... B62D 55/084 180/906
6,176,334 B1 * 1/2001 Lorenzen ............... B62D 21/14 464/134
8,662,216 B2 * 3/2014 Roucka ................... E02F 9/024 180/9.46

(Continued)

FOREIGN PATENT DOCUMENTS

EP 1238897 9/2002
WO 2017139356 8/2017

*Primary Examiner* — Christopher B Wehrly
(74) *Attorney, Agent, or Firm* — Themis Law

(57) ABSTRACT

A tracked undercarriage for oscillating and retractable operating machines includes a main frame, a track unit mounted on each of two opposite sides of the main frame, and a sliding frame mounted on each of the two opposite sides of the main frame, Each sliding frame has the dual function of translating the corresponding track unit with respect to the main frame and to vary the inclination of the track unit with respect to the main frame.

9 Claims, 3 Drawing Sheets

(56) References Cited

U.S. PATENT DOCUMENTS

| | | | | |
|---|---|---|---|---|
| 8,875,815 | B2 * | 11/2014 | Terrien | B62D 55/065 180/9.3 |
| 11,091,358 | B1 * | 8/2021 | Ourada | B62D 55/14 |
| 2001/0025732 | A1 * | 10/2001 | Lykken | B62D 55/084 180/9.1 |
| 2015/0211207 | A1 * | 7/2015 | Yamamoto | E02F 9/024 180/9.23 |
| 2015/0321708 | A1 * | 11/2015 | Van Mill | B62D 55/06 280/28.5 |
| 2018/0072356 | A1 * | 3/2018 | Borntrager | B66F 9/07577 |
| 2019/0270489 | A1 * | 9/2019 | Heimbuch | B62D 55/065 |
| 2020/0166102 | A1 * | 5/2020 | Cisek | F16H 1/48 |
| 2024/0375727 | A1 * | 11/2024 | Bertuzzi | B62D 55/065 |

* cited by examiner 100
130
530
132
131
122
510
Y1
510
530
500
520
500
310
300
110
113
Y
200
112
210
121
220
120
X 130
120
300
200
400
430
340
240
110
150
310
210
320
220
Y1
140
131
121
400
330
230
113
112
100
Y
X 130
120
300
200
340
400
410
420
240
350
250
Y1
350
250
131
121
330
400
410
230
113
112
100
Y
X

TRACKED UNDERCARRIAGE FOR OPERATING MACHINES

The present patent relates to operating machines and in particular concerns a new tracked undercarriage for working machines.

The prior art includes operating machines, such as drilling machines, excavators, etc., equipped with a tracked undercarriage which serves as the support frame and the propulsion system of the machine.

Tracked undercarriages are normally equipped with a main frame on which the machine is mounted and two tracked undercarriages mounted on the two opposite sides of the main frame. Each of said undercarriages in turn comprises a structure equipped with at least one track.

The two track units are mounted parallel to each other determining the direction of movement of the machine.

Tracked undercarriages with variable distance between tracks are also known in the prior art, that is, able to symmetrically vary the relative distance between both tracked undercarriages. Normally, each track unit can be moved close at a minimum distance from the main frame while the machine is moving, while the same distance is extended from the main frame in an enlarged configuration when the machine is in operation in order to improve its stability.

To enable this change of configuration, said main frame generally comprises at least two seats for the sliding housing of the corresponding beam elements integral with the respective tracked undercarriage. The sliding of the track units is generally controlled by hydraulic cylinders.

The prior art also comprises track units with variable inclination of their undercarriages, commonly called oscillating undercarriages, which have means for selectively varying the inclination of one or both track units with respect to the main frame.

For example, document EP 1238897 relates to a tracked undercarriage comprising a main frame and two track units mounted on the two opposite sides of the main frame, and wherein said two track units are hinged to said main frame so that each tracked undercarriage can oscillate with respect to the main frame so as to adapt to the irregularities of the ground. In particular, one wheel of both track units is mounted on the same fixed axis, while a second wheel of each track unit can translate upwards thanks to compensation means.

The present patent relates to a new tracked undercarriage with variable and oscillating undercarriages for operating machines.

The object of the present invention is to be able to control both the variation of the distance between both track units and the variation of the inclination of each track unit with respect to the main frame.

One advantage of the present invention is that it protects the hydraulic cylinders which are responsible for varying the inclination of the tracked undercarriages, which are enclosed within the frame of the new undercarriage, as described and claimed below.

These and other direct and complementary objects are achieved by the new tracked undercarriage for operating machines comprising in its main parts:

- a main frame defining a first longitudinal direction;
- two track units, each mounted on each of the two opposite sides of said main frame and arranged parallel to said first longitudinal direction, each track unit in turn comprising a structure, at least one track mounted on said structure and means for driving said at least one track;
- two sliding frames, each mounted to each of said two opposite sides of said main frame, and wherein said sliding frame in turn comprises:

- a longitudinal member placed parallel to said first longitudinal direction and interposed between said main frame and the corresponding track unit;
- first constraint means, for slidingly constraining said longitudinal member to said main frame, such that said longitudinal member can translate with respect to said main frame in a second translation direction, orthogonal to said longitudinal direction;
- second constraint means, for rotatably constraining the structure of the corresponding track unit to the corresponding longitudinal member, such that said track unit can rotate with respect to said longitudinal member around an axis of rotation, orthogonal to said longitudinal direction;
- translation means, suited to slide said longitudinal member with respect to said main frame in said second translation direction;
- rotation means, suited to rotate said at least one track unit with respect to said longitudinal member around said axis of rotation.

Said sliding frame on each side of the main frame thus serves as an intermediate element between the main frame and each track unit, and is intended to effectively coordinate the translation movement of the track units, to expand/contract the width of the undercarriage, with the rotation movement of each of the two track units, to vary the inclination of each tracked undercarriage with respect to the main frame.

Said translation means comprise at least one hydraulic cylinder acting on said longitudinal member the extension/contraction of which causes the corresponding translation of the longitudinal member, that is, of the sliding frame, with respect to the main frame.

In a preferred embodiment, said sliding frame comprises at least one beam placed parallel to said translation direction and slidably housed in a guide or seat made in said main frame.

In a further preferred embodiment, said at least one beam of the sliding frame of one side slides inside a cavity prepared in the beam of the sliding frame of the opposite side between a position of maximum insertion, when the two opposite sliding frames are in the position of maximum contraction, and a position of minimum insertion, when the two opposite sliding frames are in the position of maximum extension.

In this embodiment, said beams of the two opposing sliding frames are preferably hollow internally, such that said at least one hydraulic cylinder may be housed inside said beams, so that the contraction/extension of the cylinder causes the sliding of one beam with respect to the other, that is to say, it causes the two sliding frames to move closer/farther away.

Said at least one hydraulic cylinder is preferably of the double-acting type, so as to cause the simultaneous and symmetrical translation of both sliding frames, with respect to each other and with respect to the main frame.

In contrast, said rotation means preferably comprise at least one hydraulic cylinder hinged between a fixed point integral with said at least one longitudinal member and at least one fixed point integral with said track unit structure, where the rotation axes of the hinges of said at least one hydraulic cylinder are parallel to said axis of rotation.

The extension/contraction of said hydraulic cylinder therefore causes the rotation of said track unit with respect to the longitudinal member, that is, with respect to said main frame, thus causing the variation of the inclination of the track unit with respect to the main frame.

Said hydraulic cylinder of each track unit is controlled by means of a hydraulic circuit, which controls its operation selectively, independently and/or simultaneously with the hydraulic cylinder of the other track unit.

The characteristics of the present undercarriage will be better clarified by the following description with reference to the drawings, attached by way of a non-limiting example.

Figure 1:
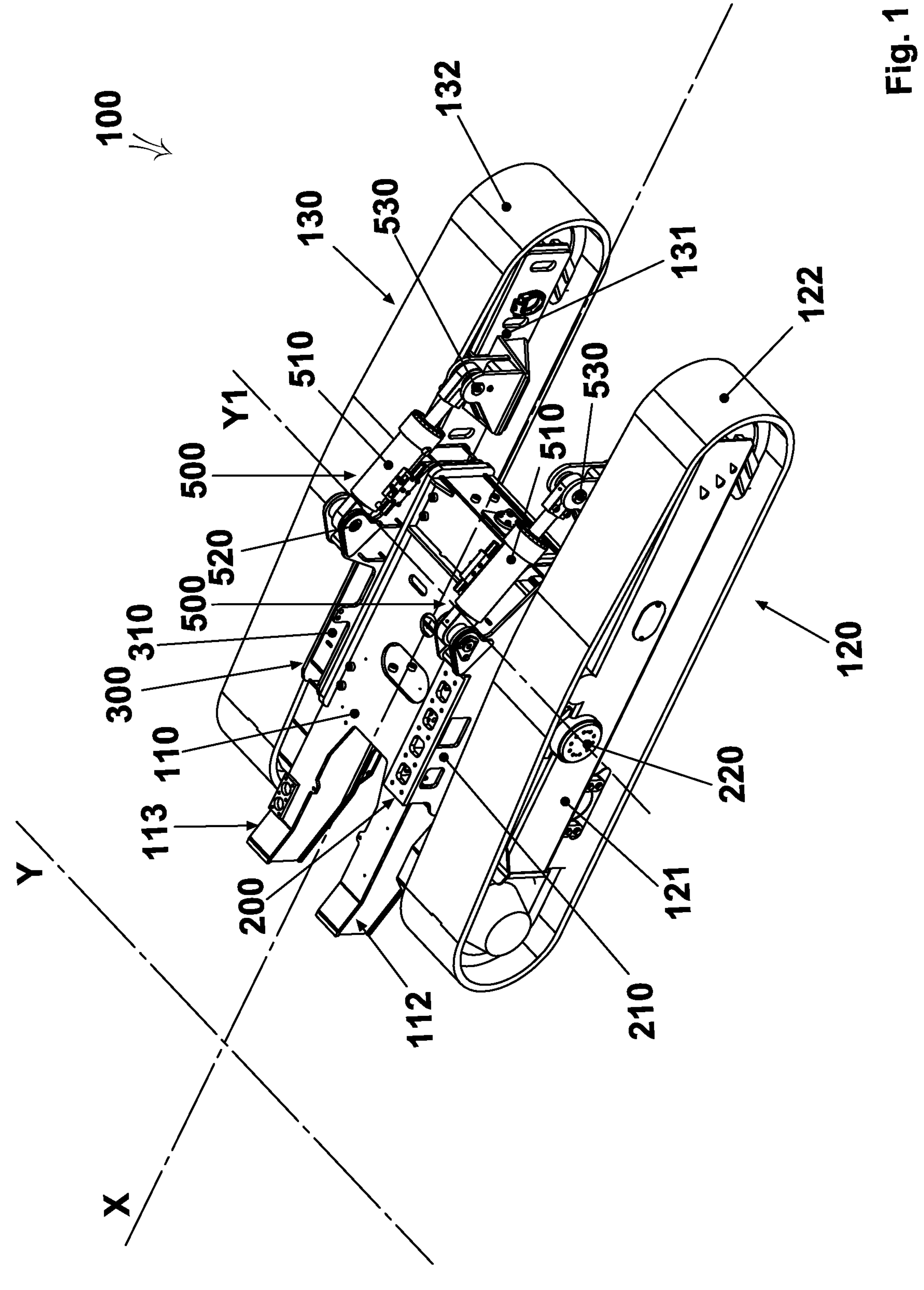
FIG. 1 shows a three-dimensional view of just the tracked undercarriage (100).

The new tracked undercarriage (100) for operating machines comprising a main frame (110) defines a first longitudinal direction (X), which corresponds to the direction of movement of the undercarriage (100).

A tracked undercarriage (120, 130) is mounted on each of the two opposite sides (112, 113) of said main frame (110), positioned parallel to said first longitudinal direction (X).

Each track unit (120, 130) in turn comprises a structure (121, 131), at least one track (122, 132) mounted on said structure (121, 131), and a motor for driving said at least one track.

A sliding frame (200, 300) is interposed between each of said two opposite sides (112, 113) of said main frame (110) and one of said track units (120, 130).

Each of said sliding frames (200, 300) in turn comprises a longitudinal member (210, 310) placed parallel to said first longitudinal direction (X) and interposed between said main frame (110) and the corresponding track units (120, 130).

Each sliding frame (200, 300) also comprises at least one connecting pin (220, 320), which rotatably constrains the structure (121, 131) of a track unit (120, 130) to the corresponding longitudinal member (210, 310).

Said pin (220, 320) is placed orthogonally to said first longitudinal direction (X) so that said track unit (120, 130) can rotate with respect to the corresponding longitudinal member (210, 310) around the rotation axis (Y1) defined by said pin (220, 230).

Said two pins (220, 320) of the two opposite sliding frames (200, 300) are suitably aligned with each other.

Said sliding frames (200, 300) are also configured to slide with respect to the main frame (110) in a translation direction (Y) parallel to said rotation direction (Y1), that is, orthogonally to said first longitudinal direction (X).

More specifically, in the preferred embodiment shown in the figures, each of said sliding frames (200, 300) comprises at least one and preferably at least two beams (230, 240, 330, 340) placed parallel to said translation direction (Y) and slidingly housed in corresponding guides or seats (140, 150) made in said main frame (110).

Figure 2:
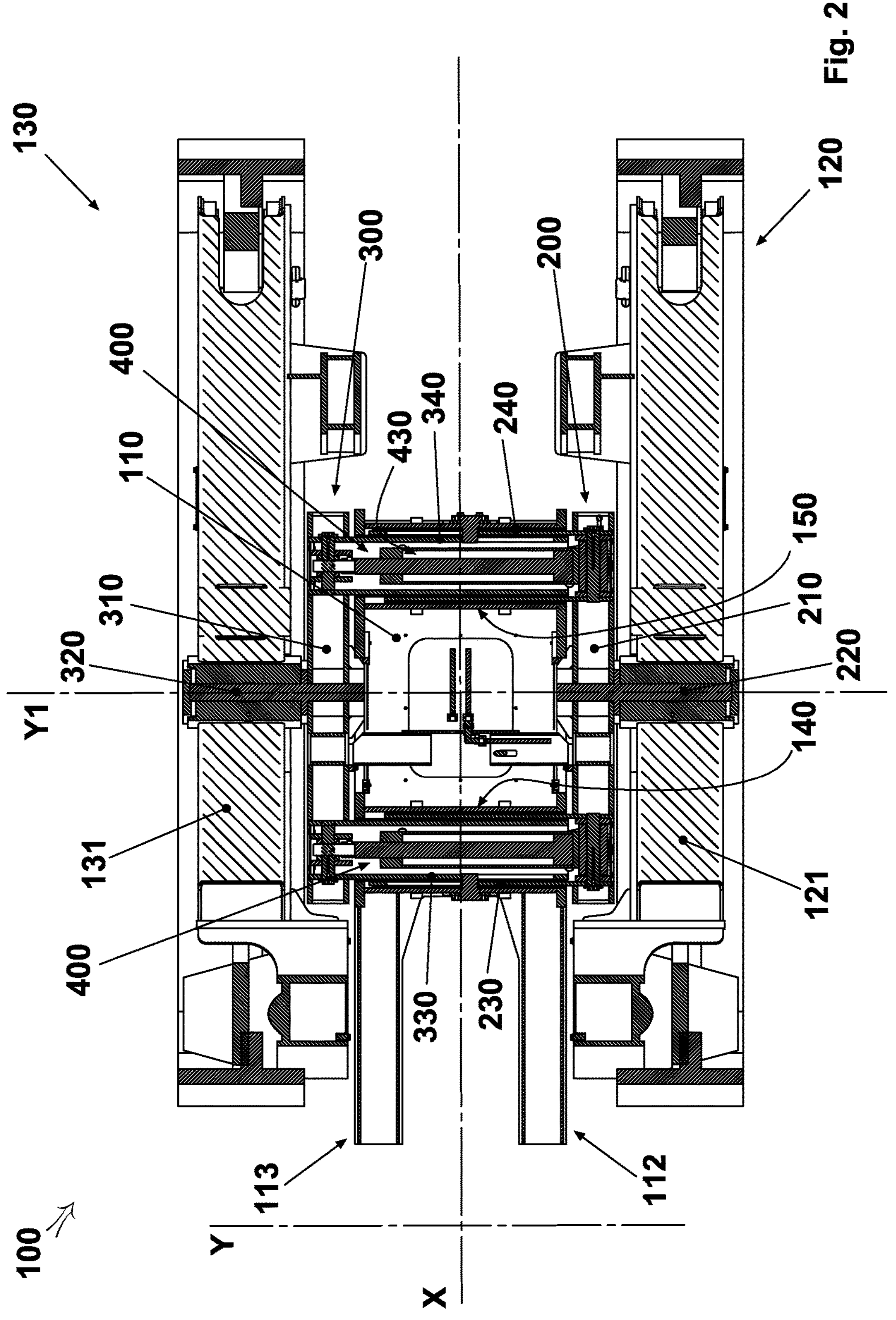
FIG. 2 shows a schematic top view of the new tracked undercarriage (100) in its contracted configuration, where the sections of the two opposite sliding frames (200, 300) are visible.
Figure 3:
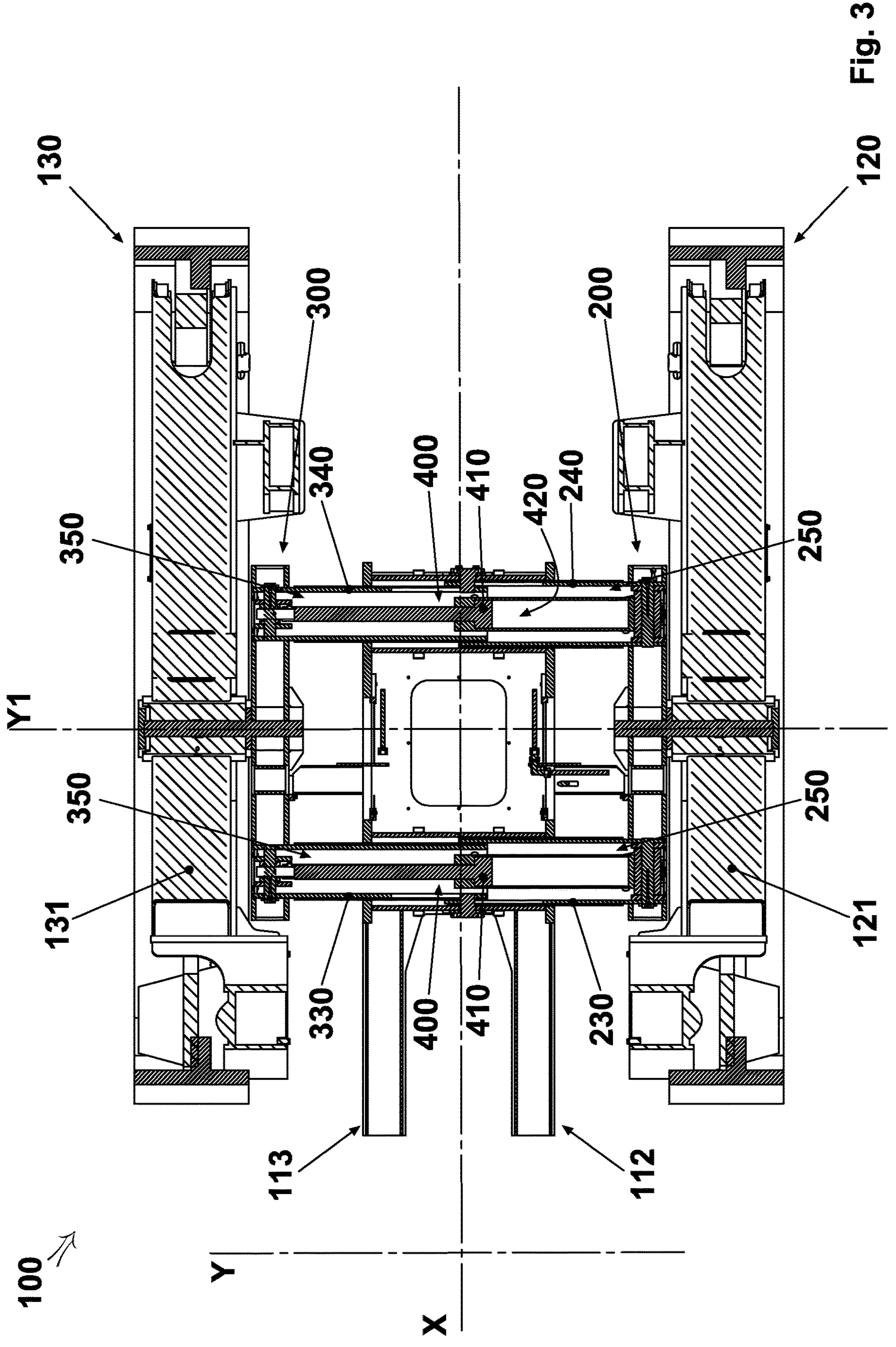
FIG. 3 shows a schematic view from above of the new tracked undercarriage (100) in its extended configuration, where the sections of the two opposite sliding frames (200, 300) are visible.

FIGS. 2 and 3 show how the beams (330, 340) of a sliding frame (300) may be configured to slide inside corresponding cavities (250) made inside the beams (230, 240) of the opposing sliding frame (200).

The two sliding frames (200, 300) thus form a telescopic structure, where the two frames (200, 300) can slide with respect to each other between a contracted position, shown in FIG. 2, and an extended position, shown in FIG. 3.

In this embodiment, said beams (230, 240, 330, 340) of the two opposite sliding frames (200, 300) comprise internal cavities (250, 350), communicating with each other, housing at least one hydraulic cylinder (400), and where the contraction/extension of the cylinder (400) causes the sliding of one beam (230, 240) with respect to the other (330, 340), that is, it causes the two sliding frames (200, 300) to approach/move away from each other.

Said at least one hydraulic cylinder (400) is preferably of the double-acting type, with two chambers (420, 430) for the injection/suction of a fluid, indicated in FIGS. 2 and 3.

Said hydraulic cylinder (400) is therefore configured in such a way as to cause and control the simultaneous and symmetrical translation of both sliding frames (200, 300), with respect to each other and with respect to the main frame (110).

Each sliding frame (200, 300) further comprises rotation means (500) for controlling the variation of inclination of each track unit (120, 130) with respect to the main frame (110).

Said rotation means (500) comprise at least one hydraulic cylinder (510) hinged between a fixed point (520) integral with the relative longitudinal member (210, 310) and at least one fixed point (530) integral with said structure (121, 131) of the relative track unit (120, 130).

The rotation axes of the hinges in said fixed points (520, 530) of said at least one hydraulic cylinder (510) are parallel to said rotation axis (Y1) defined by said pin (220, 320). The extension/contraction of said hydraulic cylinder (510) therefore causes the rotation of the relative track unit (120, 130) with respect to the corresponding longitudinal member (210, 310), that is, with respect to said main frame (110), thus causing the variation of the inclination of each track unit (120, 130) with respect to the main frame (110).

Each of said hydraulic cylinders (510) of each of said sliding frames (200, 300) is controlled by its own hydraulic circuit, so that it is possible to control the inclination of each of said track units (120, 130) selectively, independently and/or simultaneously with the opposite track unit (130, 120).

Said hydraulic cylinder (510) may preferably be installed above said longitudinal member (210, 310) and oriented parallel to said first longitudinal direction (X).

Therefore, with reference to the preceding description and the attached drawings the following claims are made.

The invention claimed is:

1. A tracked undercarriage for operating machines comprising:
- a main frame defining a first longitudinal direction;
- a track unit mounted on each of two opposite sides of said main frame and arranged parallel to said first longitudinal direction, each track unit comprising a structure and at least one track mounted on said structure; and
- a sliding frame mounted on each of said two opposite sides of said main frame, wherein said sliding frame comprises:
- a longitudinal member arranged parallel to said first longitudinal direction and interposed between said main frame and the corresponding track unit;
- first constraining means, for slidingly constraining said longitudinal member to said main frame, said first constraining means being configured to enable said longitudinal member to translate with respect to said main frame in a second translation direction, orthogonal to said longitudinal direction;

second constraining means, for rotatably securing the structure of the corresponding track unit to a corresponding longitudinal member, said second constraining means being configured to enable said track unit to rotate with respect to said longitudinal member around an axis of rotation, orthogonal to said longitudinal direction;

translation means, configured to cause a sliding of said longitudinal member with respect to said main frame in said second translation direction; and rotation means, configured to cause a rotation of said track unit with respect to said longitudinal member around said rotation axis, wherein said first constraining means of each sliding frame comprise at least one beam placed parallel to said second translation direction and slidably housed in a guide or seat made in said main frame, and wherein said at least one beam of the sliding frame on one side slides inside a cavity made in the at least one beam of the sliding frame of an opposite side, such that the two sliding frames mounted on said two opposite sides together make up a telescopic structure, and can slide relative to each other between a contracted position and an extended position.

2. The tracked undercarriage according to claim 1, wherein said first constraining means of each sliding frame comprise at least two of said beams parallel to each other.

3. The tracked undercarriage according to claim 1, wherein said translation means comprise at least one hydraulic cylinder acting on said sliding frame, extension or contraction of said sliding frame causing a corresponding translation of the sliding frame with respect to the main frame.

4. The tracked undercarriage according to claim 3, wherein said at least one beam of each opposing sliding frame comprises internal cavities communicating with each other housing said at least one hydraulic cylinder, and wherein the contraction or extension of said at least one cylinder causes a sliding of one beam with respect to another, thereby causing a reciprocal sliding of said two sliding frames.

5. The tracked undercarriage according to claim 3, wherein said at least one hydraulic cylinder is of a double-acting type.

6. The tracked undercarriage according to claim 1, wherein said second constraining means comprise at least one connecting pin between said longitudinal member and said structure of a respective track unit, and wherein said at least one connecting pin is placed orthogonally to said first longitudinal direction and enables a rotation, around said axis of rotation, of said track unit with respect to said sliding frame.

7. The tracked undercarriage according to claim 6, wherein the at least one connecting pin comprises two coaxial pins of said two opposing sliding frames.

8. The tracked undercarriage according to claim 3, wherein said rotation means comprise at least one hydraulic cylinder hinged between a fixed point integral with said longitudinal member and at least one fixed point integral with said structure of the track unit, and wherein rotation axes of hinges of said at least one hydraulic cylinder are parallel to said axis of rotation.

9. The tracked undercarriage according to claim 3, wherein said at least one hydraulic cylinder of each sliding frame is controlled by a hydraulic circuit which controls an operation of said at least one hydraulic cylinder selectively, independently and/or simultaneously with said hydraulic cylinder of another sliding frame of said tracked undercarriage.

* * * * *